US009179763B2

(12) United States Patent
Anari et al.

(10) Patent No.: US 9,179,763 B2
(45) Date of Patent: Nov. 10, 2015

(54) CAMERA FLOAT

(71) Applicants: Anthony Francis Anari, Sussex, NJ (US); Ryan Paul Vosburg, Riverdale, NJ (US); Russell VanZile, III, Riverdale, NJ (US)

(72) Inventors: Anthony Francis Anari, Sussex, NJ (US); Ryan Paul Vosburg, Riverdale, NJ (US); Russell VanZile, III, Riverdale, NJ (US)

(73) Assignee: AR2 PRODUCTS LLC, Pompton Plains, NJ (US)

( * ) Notice: Subject to any disclaimer, the term of this patent is extended or adjusted under 35 U.S.C. 154(b) by 12 days.

(21) Appl. No.: 13/998,325

(22) Filed: Oct. 21, 2013

(65) Prior Publication Data

US 2015/0107055 A1 Apr. 23, 2015

(51) Int. Cl.
*A45F 5/10* (2006.01)
*G03B 17/00* (2006.01)

(52) U.S. Cl.
CPC . *A45F 5/10* (2013.01); *G03B 17/00* (2013.01); *Y10T 16/469* (2015.01)

(58) Field of Classification Search
CPC ... Y10T 16/44; Y10T 16/469; Y10T 16/4713; B25G 1/10; B25G 3/26; G03B 17/563; G03B 17/00; F16M 13/04; B63B 22/00; B63B 22/24; A45F 5/10
USPC ........ 16/110.1, 422, 426; 441/1, 32; 396/420, 396/423; D16/243
See application file for complete search history.

(56) References Cited

U.S. PATENT DOCUMENTS

| | | | | |
|---|---|---|---|---|
| 150,189 | A * | 4/1874 | Reid | 441/32 |
| 2,617,142 | A * | 11/1952 | Cadwell et al. | 294/139 |
| 3,894,648 | A * | 7/1975 | Croullebois | 220/4.28 |
| 4,155,453 | A * | 5/1979 | Ono | 206/522 |
| 4,545,660 | A * | 10/1985 | Rudolf | 396/425 |
| 4,966,279 | A * | 10/1990 | Pearcy | 206/315.11 |
| D320,995 | S * | 10/1991 | Fukuda et al. | D16/243 |
| 6,293,449 | B1 * | 9/2001 | McGuire et al. | 224/420 |
| D592,235 | S * | 5/2009 | Bryant et al. | D16/243 |
| 7,684,694 | B2 * | 3/2010 | Fromm | 396/376 |
| D630,239 | S * | 1/2011 | Huguley | D16/243 |
| 8,037,711 | B1 * | 10/2011 | Mesaros et al. | 62/384 |
| D678,386 | S * | 3/2013 | Huguley | D16/243 |
| D678,387 | S * | 3/2013 | Stump et al. | D16/244 |
| D701,554 | S * | 3/2014 | Huguley | D16/243 |
| 2010/0024441 | A1 * | 2/2010 | Yeung | 62/56 |
| 2012/0315813 | A1 * | 12/2012 | Rossini | 441/1 |
| 2014/0273678 | A1 * | 9/2014 | Meyer | 441/31 |

FOREIGN PATENT DOCUMENTS

JP 2009229835 A * 10/2009

* cited by examiner

*Primary Examiner* — William Miller
(74) *Attorney, Agent, or Firm* — Day Pitney LLP

(57) ABSTRACT

A hand grip designed to be used in or near water that may be connected to either an image capturing device or the case that holds the image capturing device. The hand grip has a main body with a first end and a second end and a mounting piece located on at least one of the first end or the second end of the main body that allows for attachment of image capturing devices. The hand grip is adapted to float in water to provide angles and views of photographs from an image capturing device connected to the mounting piece while in the water.

4 Claims, 5 Drawing Sheets

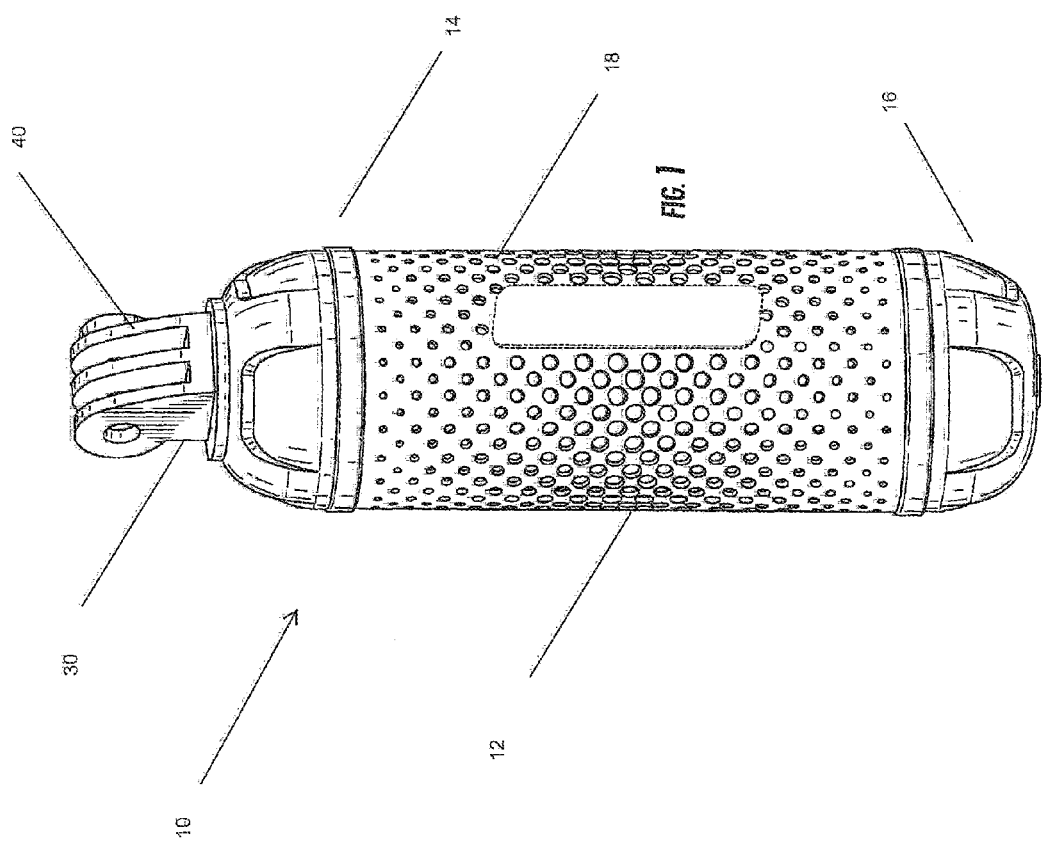

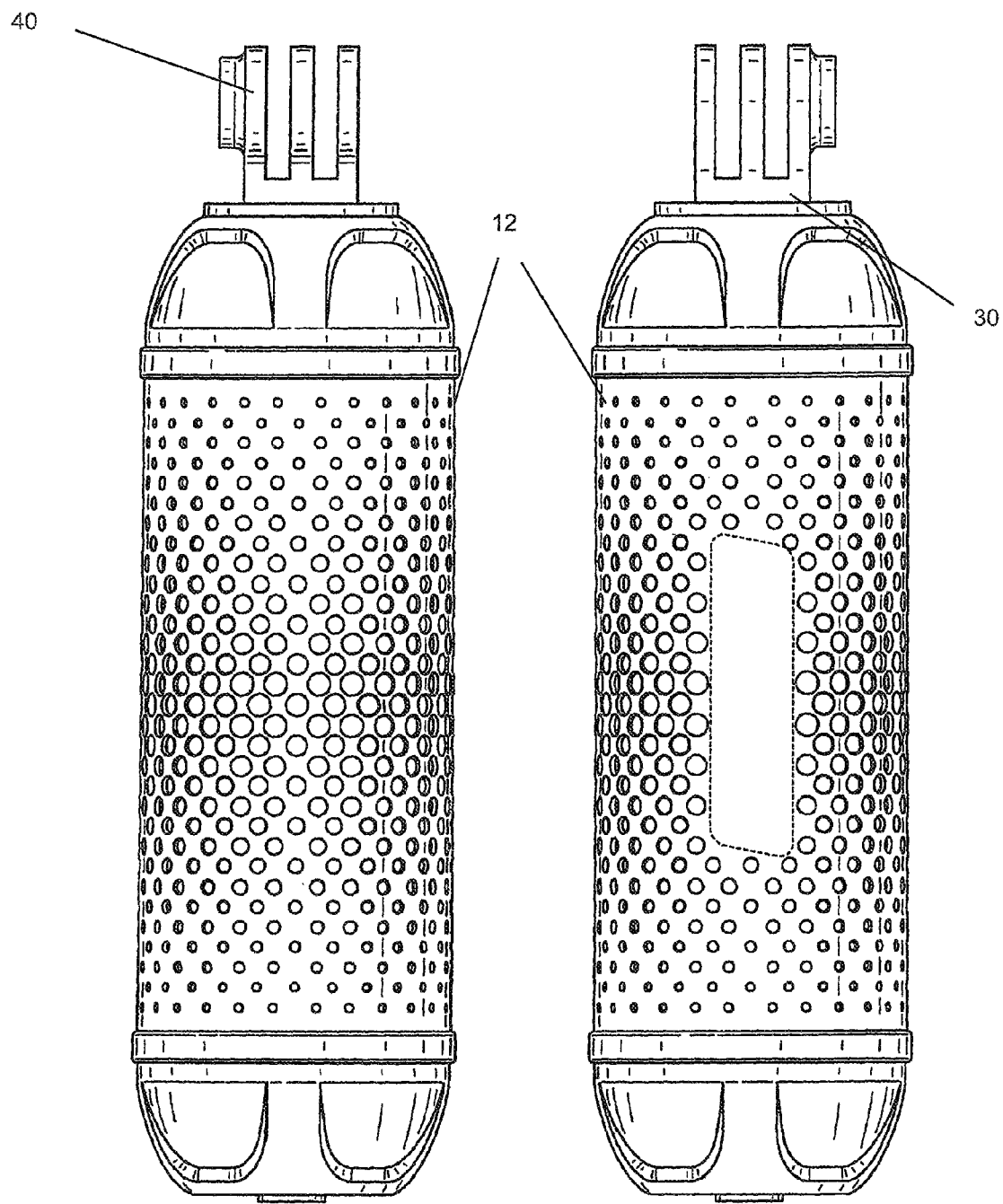

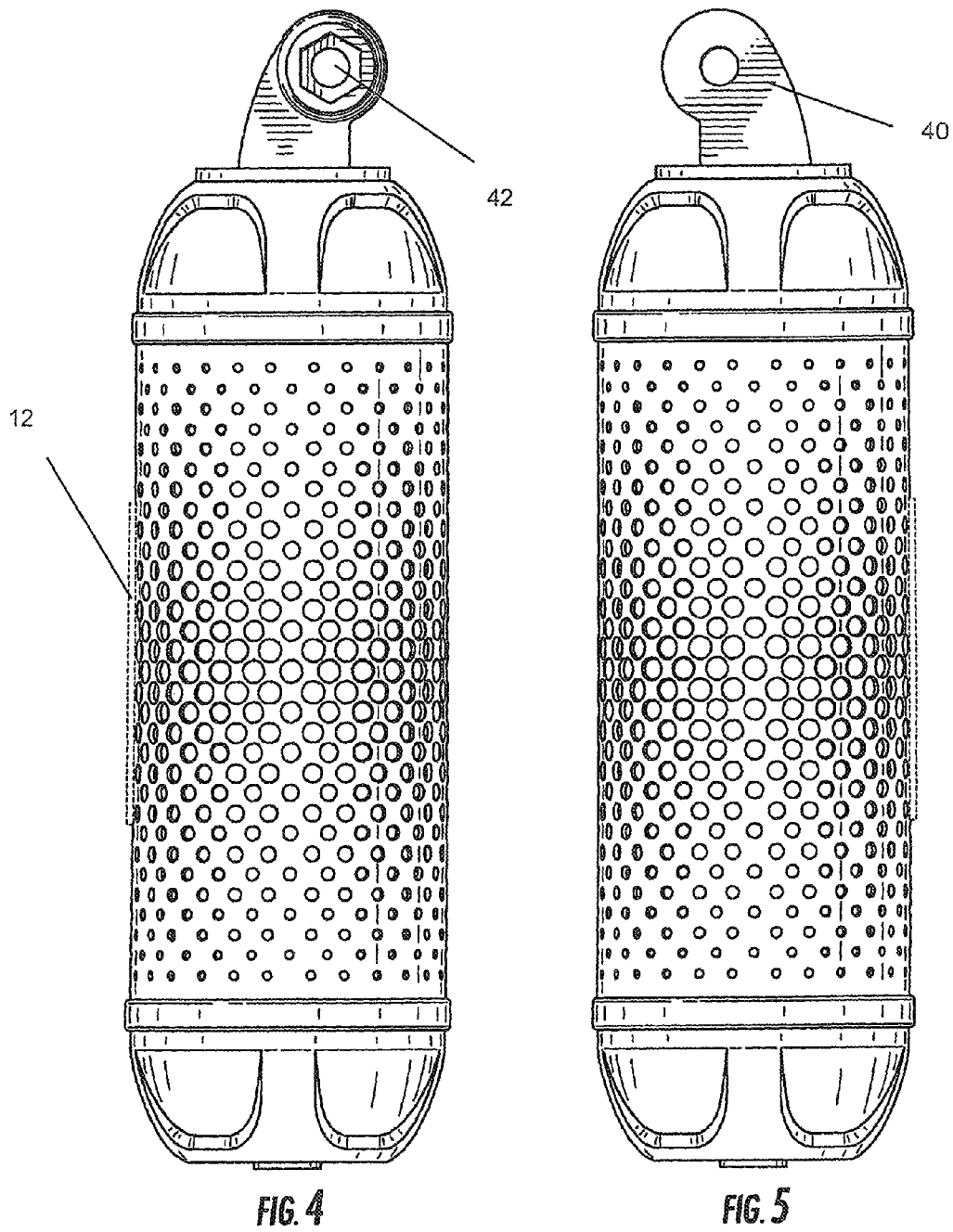

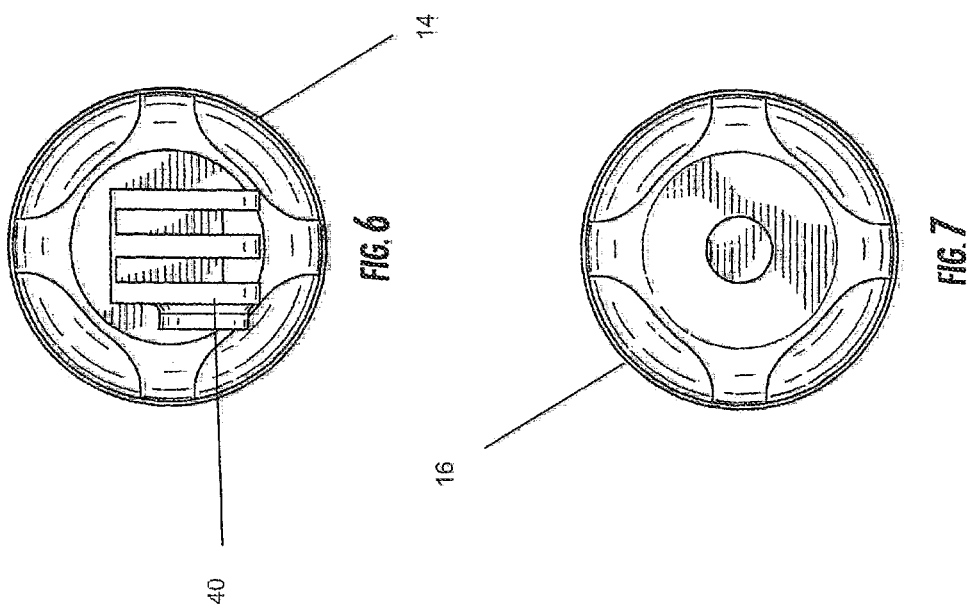

CAMERA FLOAT

CROSS-REFERENCE TO RELATED APPLICATIONS

This application claims priority to U.S. Provisional Application #61/716,556, filed Oct. 21, 2012.

DEFINITIONS

Image Capturing Device—when the terms "image capturing device" are used together in this application they mean any instrument that can capture an image such as a smartphone, a camera or a video camera.

Encased—when the term "encased" is used in this application it means a casing that surrounds a camera, smartphone or a videocamera.

Hand Grip—when the term "hand grip" is used it means a part of, or attachment to, an object, allowing it to be moved or used by hand

BACKGROUND OF THE INVENTION

This invention relates to photography and devices used to hold and steady image capturing devices. This invention is a hand grip designed to be used in or near water that may be connected to either an image capturing device or the case that holds the image capturing device.

DESCRIPTION OF PRIOR ART

This invention is a hand grip designed to be used in or near water that may be connected to either an image capturing device or the case that holds the image capturing device. This invention seeks to solve three problems that exist in the field of photography. Presently there is no device that addresses any of the following three problems. The first problem this invention solves is it increases the surface area of an image capturing device to which a user can hold, thereby reducing the risk of dropping the same and provides extended views or angles from which a user can capture an image. By attaching the image capturing device or its case to this hand grip, the user can now hold onto any portion of the grip or the image capturing device itself. The additional surface area provided enables the user to obtain different angles and views from his image capturing device.

The second problem this invention solves is that it provides buoyancy by which an image capturing device can float in the water. This hand grip is both waterproof and buoyant. This allows the user to both use the hand grip in water and to locate the image capturing device if it falls out of the user's reach. Additionally, the third problem this invention seeks to solve is that it is visible in water. This hand grip is preferably made in bright colors so as to be readily seen in water, but, as mentioned previously, is intended to increase the surface area of the image capturing device to make it more visible if dropped in the water, especially since it will float on the water's surface.

This invention was designed to aid in recreational photography and sports photography. The hand grip allows the user to hold the image capturing device for extended periods of time without the user's hand getting tired and without his hand muscles becoming fatigued as the hand grip is designed to fit within the surface area of the hand while in the relaxed and open position without requiring the muscles constrict around a small image capturing device. As a result of these benefits, there is less of a risk of movement, which results in better overall photographs or videos.

Presently in the field of photography, there is a need for a hand grip that can be used in any type of weather or climate and that can float in the event it is dropped in water or most types of liquid. Further, image capturing devices are currently used outdoors and many times in settings where there is water present. The currents trends in photography include capturing images of people, wild life and landscapes not only in dry, pristine climates but, rather in rainy, snowy, even icy climates. This presents a need for a device that can float and that can attach to the cases of image capturing devices. While image capturing devices are often waterproof to prevent from damages when splashed, it is advantageous to provide a mechanism to allow an image capturing device to float if dropped in water as opposed to sinking and becoming fully immersed in water. This hand grip is the answer to this need.

The purpose of this present invention is to enable its user to obtain different angles and views from their image capturing device by providing a greater surface area on which the image capturing device can be held, to float the image capturing device itself and to enable the user to locate the image capturing device if it is dropped into the water.

BRIEF SUMMARY OF THE INVENTION

This invention is a hand grip designed to be used in or near water that may be connected to either an image capturing device or a case that holds the image capturing device. This invention is a hand grip that is comprised of a cylindrical body and a mounting piece located on one end of the hand grip that allows for attachment of image capturing devices. The hand grip is further comprised of a wrist strap that may be attached.

This invention is a hand grip that is comprised of a cylindrical body with a first end and a second end and a mounting piece located on the first end of the cylindrical body that is preferably comprised of three prongs. Each of these prongs preferably contains a hole that allows for a screw to pass through. On one of the preferably ¾ inch holes, there is a circular extension that a preferably ½ inch by ½ inch metal cap is secured to. The hand grip is further comprised of an inverted texture on the cylindrical body of the hand grip. The hand grip ranges in sizes, measuring from the top of the hand grip to bottom of the hand grip, from 4 inches up to and including 14 inches.

The hand grip is further comprised of a wrist strap that may be attached to the hand grip. The wrist strap is optionally attached by the user. The wrist strap connects to the mounting piece at the top portion of the hand grip by sliding the loop of the strap over the mounting piece before attaching the hand grip to the image capturing device. The hand grip may be used without the wrist strap.

In an alternative embodiment, the hand grip is comprised of a cylindrical body with a first end and a second end and a mounting piece on the first end of the cylindrical body that is comprised of a preferably ¼" by 20 thread per inch screw that is preferably 5 mm high and 6 mm wide. In this embodiment, the hand grip can be attached directly to the image capturing device by screwing the screw on the hand grip into the image capturing device itself.

The hand grip is preferably comprised of polyproplyne with the exception of a ½ inch by ½ inch metal screw cap that is connected to the mounting piece and the nylon wrist strap that is attached to the mounting piece. The hand grip is made preferably from two pieces that are fitted together and glued securely to provide an airtight fit. Polyproplyne is poured into a mold that, when hardened, preferably produces two halves that comprise the hand grip split lengthwise. The two lengthwise pieces can then be glued together and a ½ inch by ½ inch metal screw cap is glued onto one end of one of the prongs. The wrist strap may be attached by slipping the loop of the strap over the mounting piece directly before attaching the image capturing device or its case. In order for the image capturing device to be attached to the hand grip, the device or it's case must have a set of prongs that correspond to the prongs of the hand grip which preferably contain ¾ inch holes that allow for a thumbscrew to pass through. The prongs of the image capturing device or case already secured to the image capturing device must fit into the spaces between the prongs on the hand grip. The ¾ inch holes on both sets of prongs must align to allow a thumbscrew to pass through the ¾ inch holes.

The image capturing device is attached to the mounting piece by fitting the image capturing device into the mounting piece and then by screwing a thumbscrew through the prongs of the hand grip and the corresponding prongs of the image capturing device. In the alternative embodiment, a screw that is preferably ¼" by 20 thread per inch that is 5 mm high and 6 mm wide that is on one end of the hand grip is directly screwed into the image capturing device.

The purpose of this present invention is to provide a device which can float to protect an image capturing device and allow the same to be located dropped into the water, and also provide a user to obtain angles and views from photographs taken by an image capturing device while floating. This invention has been designed in bright and neon colors to ensure visibility of separation from its user.

This hand grip is made to attach to an image capturing device by simply fitting the image capturing device into the mounting piece on the top of the hand grip and preferably screwing a thumbscrew through both the camera and the mounting piece thus securing the image capturing device. The hand grip with the image capturing device attached to it can then float while in water to keep the image capturing device afloat as well. This invention allows the user to hold the hand grip itself instead of the image capturing device to take pictures. Because this invention floats in the water and that provides visibility of the image capturing device through use of its floating ability and preferably bright colors. More particularly, this invention is a hand grip specifically designed to be used in or near water in conjunction with an image capturing device.

BRIEF DESCRIPTION OF THE DRAWINGS

FIG. 1 is a front perspective view of the present invention, a camera float;

FIG. 2 is a rear elevational view of the camera float seen in FIG. 1;

FIG. 3 is a front elevational view of the camera float seen in FIG. 1;

FIG. 4 is a right side elevational view of the camera float seen in FIG. 1;

FIG. 5 is a left side elevational view of the camera float seen in FIG. 1;

FIG. 6 is a top plan view of the camera float seen in FIG. 1;

FIG. 7 is a bottom plan view of the camera float seen in FIG. 1; and

DETAILED DESCRIPTION OF THE INVENTION

Figure 8:
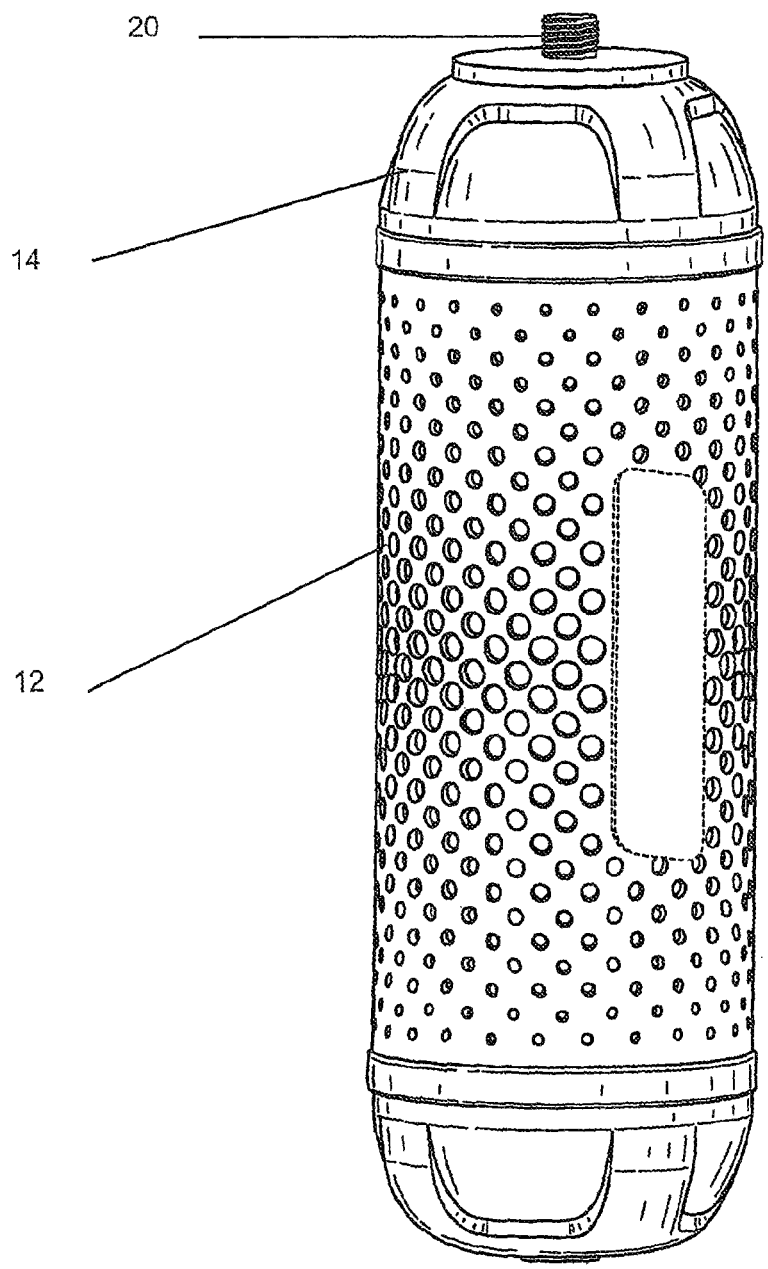
FIG. 8 is a front perspective view of the camera float seen in FIG. 1, with the mounting piece on the main body having been removed.

Description will now be given of the invention with reference to the attached FIGS. 1-8. It should be understood that these figures are exemplary in nature and in no way serve to limit the scope of the invention as the invention will be defined by claims, and the scope of the invention will be the scope of the claims, as interpreted by the Courts.

This invention is a hand grip designed to be used in or near water that may be connected to either an image capturing device or the case that holds the image capturing device. This invention is a hand grip that is comprised of a cylindrical body, a mounting piece located on the top potion of the hand grip that allows for attachment of image capturing devices and a wrist strap. The hand grip may be used with or without the wrist strap.

As seen in the Figures, hand grip 10 comprises a main body 12 having a first end 14 and a second end 16. Main body 12 is preferably cylindrical and more preferably has a length of approximately four to fourteen inches. Main body 12 is preferably of a circumference small enough that it can easily and securely fit within the grip of a user's hand without risk of falling. First end 14 and second end 16 are preferably rounded, and the exterior surface of main body 12 preferably comprises an inverted texture 18 intended to aid in a user's gripping of the hand grip 10, especially while in water.

On the outer surface of first end 14 is a screw 20 extending from first end 14 with external screw threads. A mounting piece 30 is provided which is configured to secure the main base 12 to an image capturing device such as a camera.

On the underside of mounting piece 30 is a hole containing internal screw threads corresponding to the external screw threads of screw 20. Thus, to attach mounting piece 30 to the main base 20, screw 20 is configured to matingly secure to the hole of mounting piece 30 by means of the corresponding external screw threads on screw 20 and internal screw threads on hole. Thus, when twisting screw 20 into hole, the mounting piece 30 will be secured to main base 12.

Mounting piece 30 comprises one or more outwardly extending prongs 40, extending out from mounting piece 30 on the surface opposite that containing hole. Prongs 40 are preferably flat and rounded and preferably equal in size and shape to one another. In the preferred embodiment of the present invention, mounting piece 30 comprising three prongs. Each prong 40 contains at least one hole 42 therethrough configured for receipt of a screw. Prongs 40 are preferably spaced a distance apart from one another to allow for receipt of corresponding prongs from an image capturing device to be placed therebetween when connected, or so that the prongs 40 can be inserted into corresponding apertures in an image capturing device or its associated case. Once the prongs 40 are aligned with the corresponding prongs on the image capturing device, an external free screw can be slid through the holes 42 of each prong 40 and secured with a locking nut to secure the mounting piece 30 to an image capturing device.

The hand grip 10 is configured to be waterproof and buoyant so as to float in water. This allows a user to secure the mounting piece 30 to an image capturing device while in the water and obtain pictures to be taken from the image capturing device floating on the surface of the water (when the image capturing device is programmed in pre-set picture-taking intervals on in a rapid-fire picture-taking mode). Alternatively, hand grip 10 allows a user to hold onto main base 12, by means of inverted texture 18, and obtain pictures from the image capturing device connected to mounting piece 30 from lengthier distances than a user's arm could reach if only holding the image capturing device directly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A hand grip for an image capturing device, comprising:
a main cylindrical body, said main body comprising a first end and a second end and having a circumference small enough to fit in the hand of a user;
a mounting piece located on at least said the first end of said main body, said mounting piece comprising a plurality of prongs extending outwardly therefrom configured for direct receipt of the image capturing device or a case therefor to releasably secure to the image capturing device or case therefore; and
a gripping texture on said main cylindrical body surrounding the lengthwise perimeter of said main cylindrical body;
wherein said main body is airtight to provide buoyancy in water.

2. The hand grip as claimed in claim 1, wherein said main body comprises a length of 4-14 inches.

3. The hand grip as claimed in claim 1, wherein each of said plurality of prongs comprises a hole configured for receipt of a screw.

4. The hand grip as claimed in claim 3, wherein said mounting piece is configured to releasably secure to the main cylindrical body by means of a screw with external screw threads extending outwardly from the first end configured to matingly secure to a screw hole on an underside of said mounting piece with corresponding screw threads.

* * * * *

UNITED STATES PATENT AND TRADEMARK OFFICE
CERTIFICATE OF CORRECTION

PATENT NO.         : 9,179,763 B2                       Page 1 of 1
APPLICATION NO.    : 13/998325
DATED              : November 10, 2015
INVENTOR(S)        : Anthony Francis Anari et al.

It is certified that error appears in the above-identified patent and that said Letters Patent is hereby corrected as shown below:

On the title page of the patent, after item (65), please include

(60)    Related U.S. Application Data

Provisional Application Number 61/716,556, filed on October 21, 2012.

Signed and Sealed this
First Day of March, 2016

Michelle K. Lee
*Director of the United States Patent and Trademark Office*